United States Patent
Leibman et al.

(10) Patent No.: US 11,080,169 B2
(45) Date of Patent: Aug. 3, 2021

(54) FRAMEWORK FOR PROVIDING BINARY RELEASE ISOLATION FOR PARTS OF A WEB APPLICATION

(71) Applicant: Google LLC, Mountain View, CA (US)

(72) Inventors: Michael Leibman, Seattle, WA (US); Yossi Kahlon, Montclair, NJ (US); Jakub Onufry Wojtaszczyk, Warsaw (PL); Jennifer Bourey, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/682,764

(22) Filed: Nov. 13, 2019

(65) Prior Publication Data

US 2021/0141711 A1   May 13, 2021

(51) Int. Cl.
*G06F 11/36* (2006.01)
*G06F 8/658* (2018.01)
*G06F 8/71* (2018.01)

(52) U.S. Cl.
CPC .......... *G06F 11/3664* (2013.01); *G06F 8/658* (2018.02); *G06F 8/71* (2013.01); *G06F 11/3604* (2013.01)

(58) Field of Classification Search
CPC ........ G06F 11/3664; G06F 8/658; G06F 8/71; G06F 11/3604
See application file for complete search history.

(56) References Cited

U.S. PATENT DOCUMENTS

| | | | |
|---|---|---|---|
| 10,235,681 B2 * | 3/2019 | Chang | G06F 40/20 |
| 2010/0281403 A1 * | 11/2010 | Yamakami | G06F 9/44526 715/760 |
| 2013/0145361 A1 * | 6/2013 | Kaegi | G06F 40/10 717/176 |
| 2014/0289709 A1 * | 9/2014 | Jayaraman | G06F 9/547 717/126 |
| 2016/0077824 A1 * | 3/2016 | Vishnepolsky | H04L 67/1002 717/172 |
| 2016/0117297 A1 * | 4/2016 | Ross | G06F 3/04847 715/241 |
| 2020/0128020 A1 * | 4/2020 | Abduljaber | H04W 12/0027 |

OTHER PUBLICATIONS

Play safely in sandboxed Iframes by Mike West, Jan. 4, 2013, 11 pages.pdf.
Micro Frontend architecture and best practices by Xenonstack Oct. 20, 2018, 13 pages.pdf.

* cited by examiner

*Primary Examiner* — Daxin Wu
(74) *Attorney, Agent, or Firm* — Lerner, David, Littenberg, Krumholz & Mentlik, LLP (57) ABSTRACT

The technology relates to executing a multi-portion web application. A web browser executing on one or more computing devices may load a main portion of a web application into a main window. The web browser may load into a sandboxed environment a feature application. The feature application may include a portion of the web application. A release isolation framework (RIF) executing on the one or more computing devices, may apply one or more patches to the sandboxed environment. The one or more patches may be configured to redirect elements from a window of the sandboxed environment to the main window.

18 Claims, 7 Drawing Sheets

FRAMEWORK FOR PROVIDING BINARY RELEASE ISOLATION FOR PARTS OF A WEB APPLICATION

BACKGROUND

Web applications are computer applications that are provided by a server to a web browser on a client device. As additional functionality and features are added to a web application, the web application may grow in size and complexity. Assuring consistent development, maintenance, and deployment of a large web application may require developers, often working in teams, be assigned to handle a portion of the full web application. However, developers may run into issues related to difficulty in compiling and building binaries giving the needs of other teams and difficulty in ensuring consistent release velocity and quality as significant testing is required of the entire web application for even minor changes to one portion of the web application. These issues may lead to an overall poor development experience. These issues may also lead to a negative user experience, as slow release schedules of large web applications may not be able to keep up with the features and release structures of standard, non-web based applications.

SUMMARY

Aspects of the disclosure are directed to executing a multi-portion web application. One aspect of the disclosure is directed to a computer-implemented method of executing a multi-portion web application. The method may include loading, by a web browser executing on one or more computing devices, a main portion of a web application into a main window. A feature application may be loaded into the sandboxed environment by the web browser. The feature application may include a portion of the web application. A release isolation framework (RIF) executing on the one or more computing devices, may apply one or more patches to the sandboxed environment, the one or more patches configured to redirect elements from a window of the sandboxed environment to the main window.

In some instances, the sandboxed environment is a hidden inline frame (iframes).

In some instances, redirecting elements to the main window by the one or more patches includes: determining whether the elements are directed to the window of the sandboxed environment; and changing the elements to be directed to the main window when the elements are determined to be directed to the window of the sandboxed environment. In some examples, redirecting elements to the main window by the one or more patches occurs when the elements are inserted into a document object model (DOM) of the main window. In some examples, the method includes assigning a sandbox identification (ID) to the elements, wherein the sandbox ID is associated with the sandboxed environment. In some examples, the method includes applying cascading style sheets (CSS) styles implemented in the sandboxed environment to only elements in the main window having the sandbox ID associated with the sandboxed environment.

In some instances, the method includes loading into one or more additional sandboxed environments, one or more additional feature applications, the one or more additional feature applications comprising additional portions of the web application; and applying, by the RIF, the one or more patches to the one or more additional sandboxed environment.

In some instances, the method includes applying, by the RIF, one or more additional patches to the main window, wherein the one or more additional patches are configured to assign a sandbox identification (ID) to each element of the feature application input into a document object model (DOM) of the main window. In some examples, upon closing the feature application, the elements of the feature application input into the DOM are removed from the DOM, wherein removal includes: identifying all elements in the DOM having the sandbox ID; and removing the identified elements.

In some instances, the method includes applying, by the RIF, one or more patches to the main window, the one or more patches configured to track document object model (DOM) elements created by the sandboxed environments.

Another aspect of the disclosure is directed to a system for executing a multi-portion web application. The system may include one or more processors; and one or more storage devices in communication with the one or more processors, wherein the one or more storage devices contain instructions configured to cause the one or more processors to: load, by a web browser, a main portion of a web application into a main window; load, into a sandboxed environment, by the web browser, a feature application, the feature application comprising a portion of the web application; and apply, by a release isolation framework (RIF), one or more patches to the sandboxed environment, the one or more patches configured to redirect elements from a window of the sandboxed environment to the main window.

In some instances, the sandboxed environment is a hidden inline frame (iframes). In some examples, redirecting elements to the main window by the one or more patches includes: determining whether the elements are directed to the window of the sandboxed environment; and changing the elements to be directed to the main window when the elements are determined to be directed to the window of the sandboxed environment. In some examples, redirecting elements to the main window by the one or more patches occurs when the elements are inserted into a document object model (DOM) of the main window. In some examples, the instructions are further configured to cause the one or more processors to: assign a sandbox identification (ID) to the elements, wherein the sandbox ID is associated with the sandboxed environment. In some examples, the instructions are further configured to cause the one or more processors to: apply cascading style sheets (CSS) styles implemented in the sandboxed environment to only elements in the main window having the sandbox ID associated with the sandboxed environment.

In some instances, the instructions are further configured to cause the one or more processors to: load into one or more additional sandboxed environments one or more additional feature applications, the one or more additional feature applications comprising additional portions of the web application; and apply, by the RIF, the one or more patches to the one or more additional sandboxed environment.

In some instances, the instructions are further configured to cause the one or more processors to: apply, by the RIF, one or more additional patches to the main window, wherein the one or more additional patches are configured to assign a sandbox identification (ID) to each element of the feature application input into a document object model (DOM) of the main window. In some examples, upon closing the feature application, the elements of the feature application input into the DOM are removed from the DOM, wherein removal includes: identifying all elements in the DOM having the sandbox ID; and removing the identified elements.

In some instances, the RIF may apply one or more patches to the main window, the one or more patches configured to track document object model (DOM) elements created by the sandboxed environments.

DETAILED DESCRIPTION

Overview

Aspects of the disclosure relate to a release isolation framework (RIF) that provides the capability to separate a large web application into individually managed feature applications that can be compiled, released, and managed independently. As an example, each feature application that is part of a web application may be loaded and executed in respective sandboxed environments within the browser, such as in hidden, inline frames (iframes). The main portion of the web application may be executed in a main window on the browser. The RIF may patch the sandboxed environments of the feature applications so that they can communicate and interact with the main portion of the web application in the main window. By doing such, a web application may include multiple feature applications executing in their respective sandboxed environments while being displayed in a single main window with shared navigational elements and services, such as permissions, routings, instrumentation, etc. Additionally, each feature application can be dynamically loaded and unloaded as needed without interfering with the operation of the other feature applications and the main portion of the web application executing in the main window.

Web applications, and portions of web applications, such as feature applications, may be executed in iframes without RIF patching; however, the abilities of the applications in the iframes may be restricted due to the design of iframes and the main page. For instance, the user interface (UI) elements in an iframe are limited to the iframe's window. As such, UI elements, such as menus, text, images, videos, controls, etc., cannot extend past the iframe window and may cutoff if the iframe attempts to display content in areas outside the iframe window. As such, unless an application is executed in an iframe that has a window that take covers the entirety of the main window, the application cannot provide UI elements across the entire UI of the main window. In the event an application was executed in an iframe that did take up the entirety of the main window, only that application could be displayed, as any other applications, including portions of applications, would be effectively blocked from having visible real-estate in the main window.

In another example, events from an iframe do not propagate to the main window. As such, any UI elements in the main window that rely on events from the iframe, such as events that should trigger the showing of toolbars, tips, dialogs, etc., will not work. In yet another example, unpredictable behavior of the UI elements in the main window may occur when the main window attempts to handle document level tasks. In this regard, events, document object model (DOM) queries, 'activeElement' queries, etc., report positions and dimensions relative to the iframe as opposed to the main window. As a result, tasks that rely on accurate position and dimension data, such as 'element.getBoundingClientRect( )' and scroll visibility triggers may not operate correctly.

Web workers, which are objects that can run JavaScript code independently of other scripts and in the background of a main window, may be used to run an application or a portion of an application. However, web workers have many technical deficiencies which would limit their ability to effectively execute feature applications. For instance, communication between web workers and the main window are asynchronous. As a result, web workers are unable to use synchronous APIs, such as a DOM API that would provide the main windows with updates from the web worker in real-time. Additionally, data cannot be directly shared between web workers and the main window. Accordingly, web workers would not be able to support feature applications without the web application being coded to avoid these issues, which may require a complete or partial rewrite of the web application.

RIF addresses the issues encountered when using web workers and iframes by patching the sandboxed environments of the feature applications. For instance, the RIF may implement a patch that intercepts calls to application programming interfaces (APIs) that interface with a document object model (DOM). The intercepted calls may be redirected by the RIF and directed to the DOM of the main window. As such, user interface (UI) data from the feature applications is shown in the main window, as opposed to the user interface of the hidden, sandboxed environment.

The RIF may also enable feature applications having isolated JavaScript code from the main window to communicate. In other words, the feature applications are executed in a separate realm from the main window. In this regard, the RIF may patch all DOM access from the feature applications in the sandboxed environments communicate with the main window, while still using the sandbox's implementations of all invoked DOM methods. As such, the sandboxed environments' implementations of invoked DOM methods may be patched or polyfilled by sandbox code such as JSCompiler, ZoneJS, instrumentation code, etc. Furthermore, since the RIF tracks all references between the main window and the sandboxed environments, the sandboxed environments may be unloaded at any time.

In another example, the RIF may isolate cascading style sheets (CSS) styles implemented in a sandboxed environment to prevent the sandboxed environment from changing the styles of the main window. For certain web applications, such as Angular applications and other web applications that use the ZoneJS library, RIF may implement a compatibility layer that makes the applications work with RIF.

The RIF enables executing multiple feature applications in a single web application. Each feature application may work within the same user interface of the main page.

Moreover, each feature application may run as a separate small application in its respective sandbox that can be dynamically loaded/unloaded as needed. By doing such, developers may develop, update, test, and release only portions of a web application at a time. Doing so may allow for a faster, more efficient release schedule of a web application with less risk of errors and bugs.

Example Systems

Figure 1:
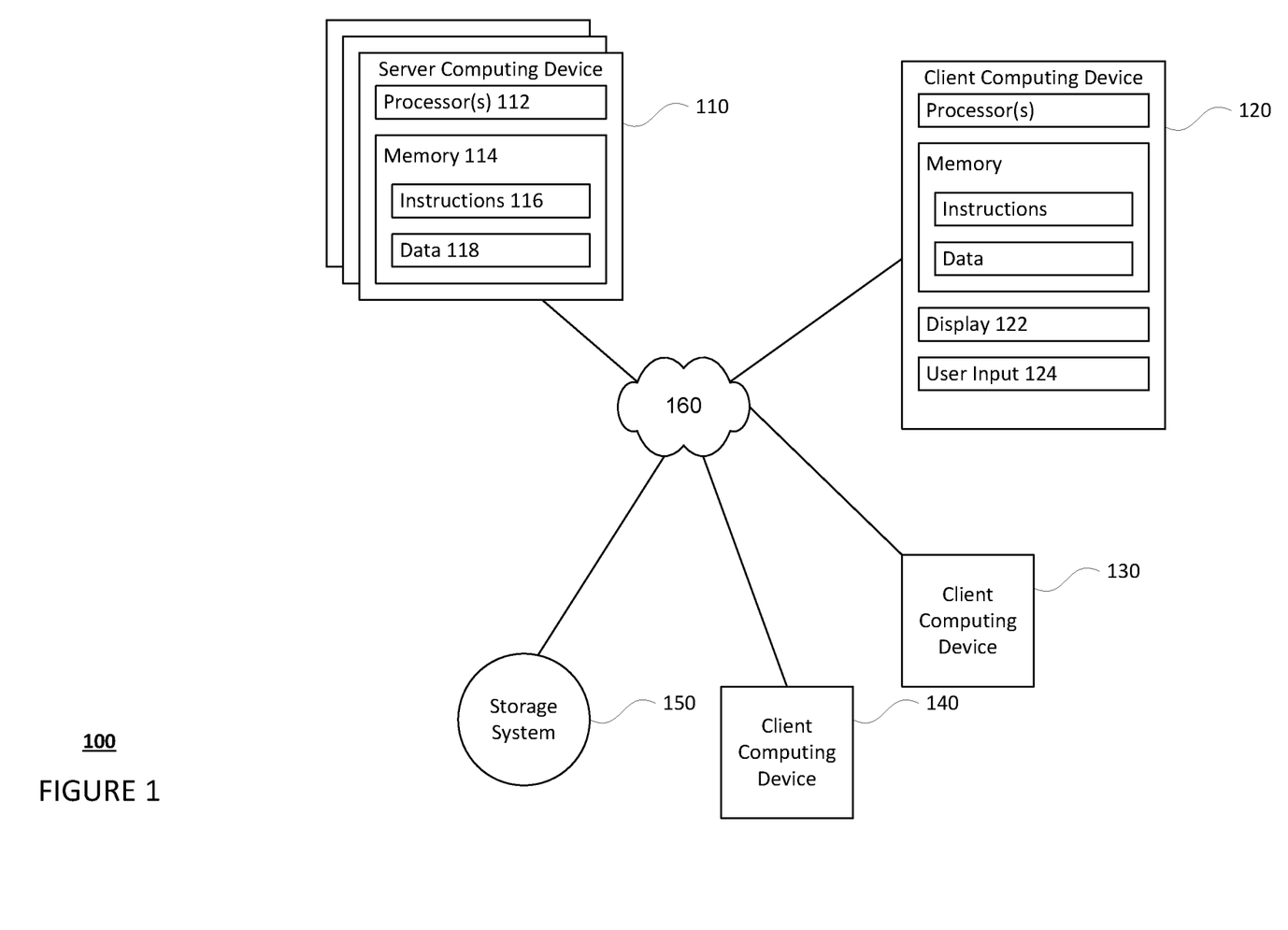
FIG. 1 is a functional diagram of an example system in accordance with aspects of the disclosure.
Figure 2:
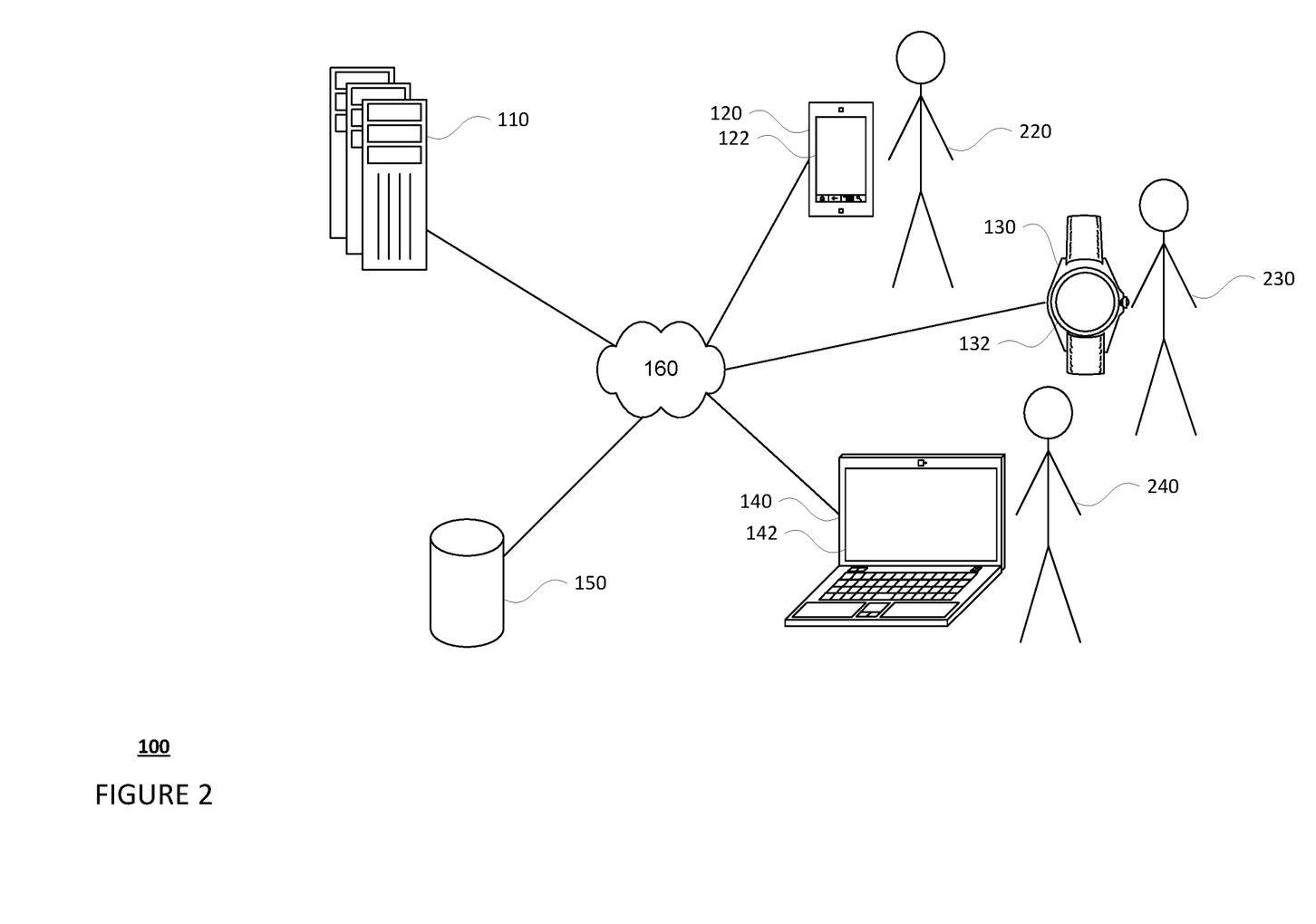
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below. Example instructions may include a web application and/or feature applications.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information, web applications, feature applications, etc., a to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touchscreen, or microphone). The client computing device may also include a camera for recording video streams and/or capturing images, speakers, a network interface device, and all of the components used for connecting these elements to one another.

Figure 3:
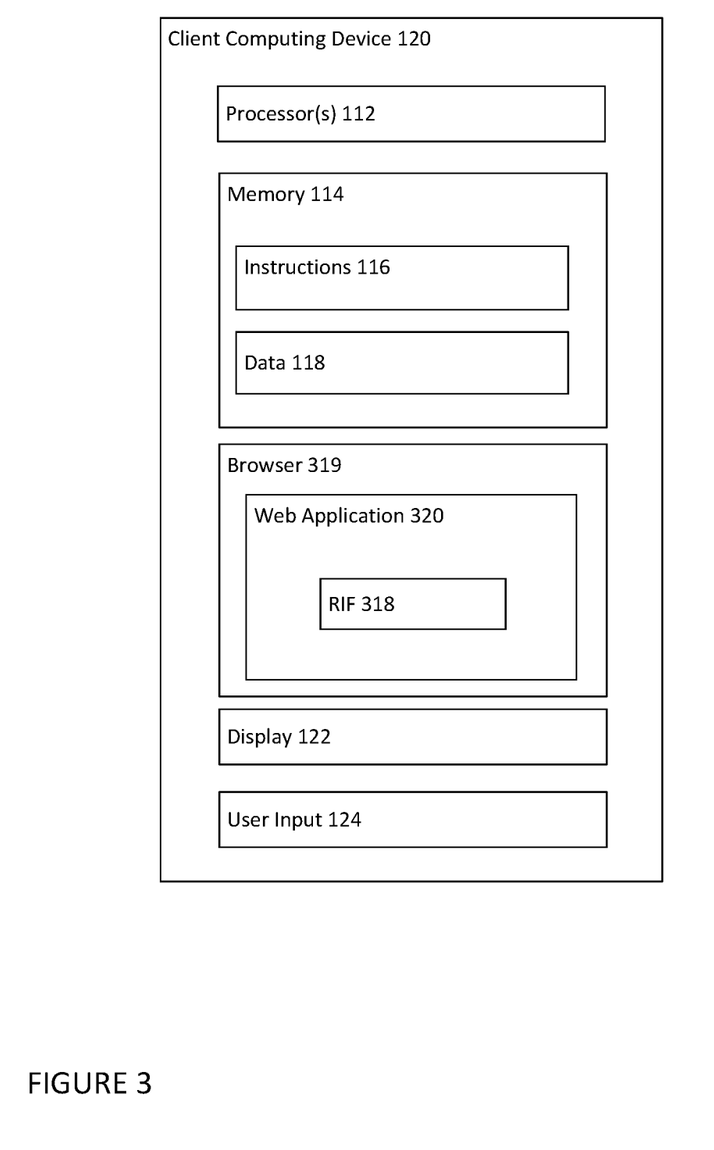
FIG. 3 is a functional diagram of an example client computing device in accordance with aspects of the disclosure.

FIG. 3 illustrates client computing device 120. A web browser 319 is installed on the client computing device 120. During operation, the web browser 319 may load a web application 320. The web application 319 that may include a release isolation framework (RIF) 318. Although only a single web browser 319 is shown, there may be more than one web browser on each client computing device.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example, the user may input information using a small keyboard, keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

The storage system 150 may store information such as data or instructions for use with web applications and/or feature application. For instance, the information stored in storage system 150 may include user data associated with users of a web application. In some instances, storage system 150 may store web applications and/or feature applications.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 4:
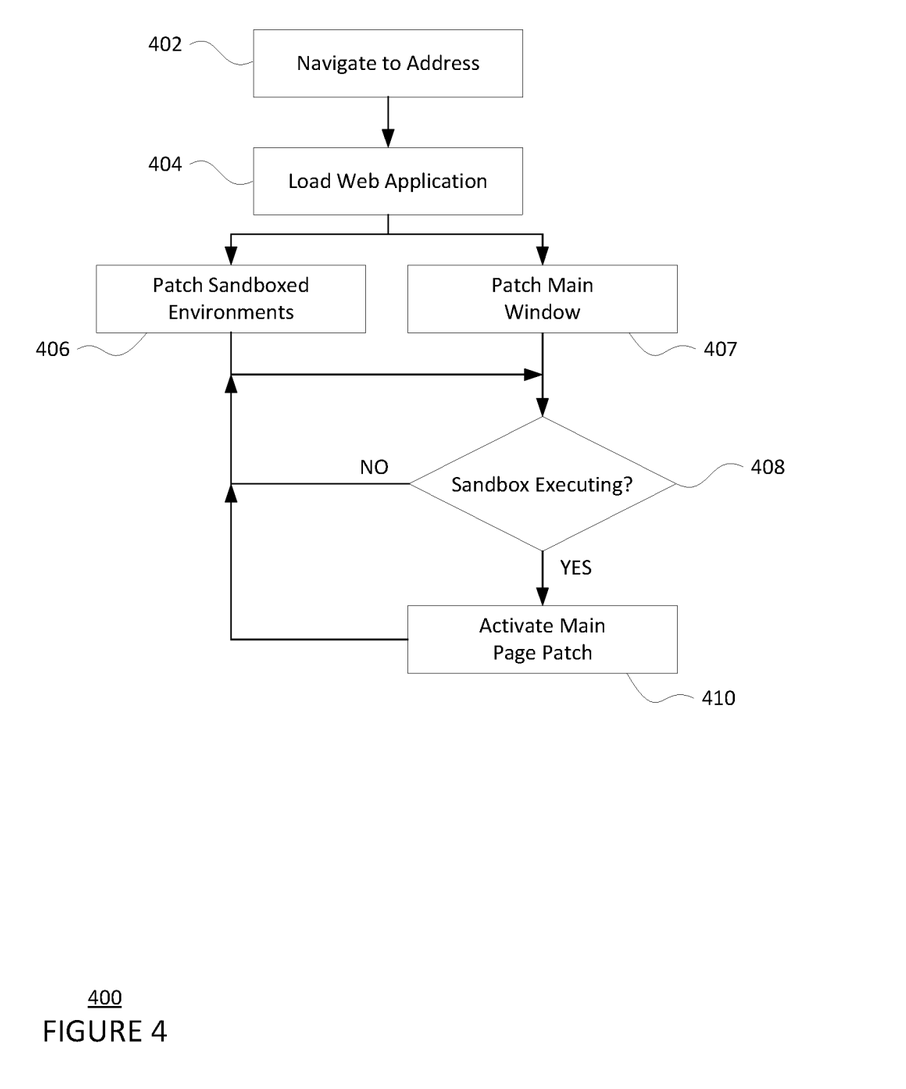
FIG. 4 is a flow diagram representing aspects of the operation of a release isolation framework in accordance with aspects of the disclosure.

A flow chart 400 outlining the operation of a release isolation framework is shown in FIG. 4. A web browser, such as web browser 319 on client computing device 120 may navigate to a network address, as shown in step 402. The network address may provide a web application that is subsequently loaded by the web browser 319, as shown in block 404.

Figure 5:
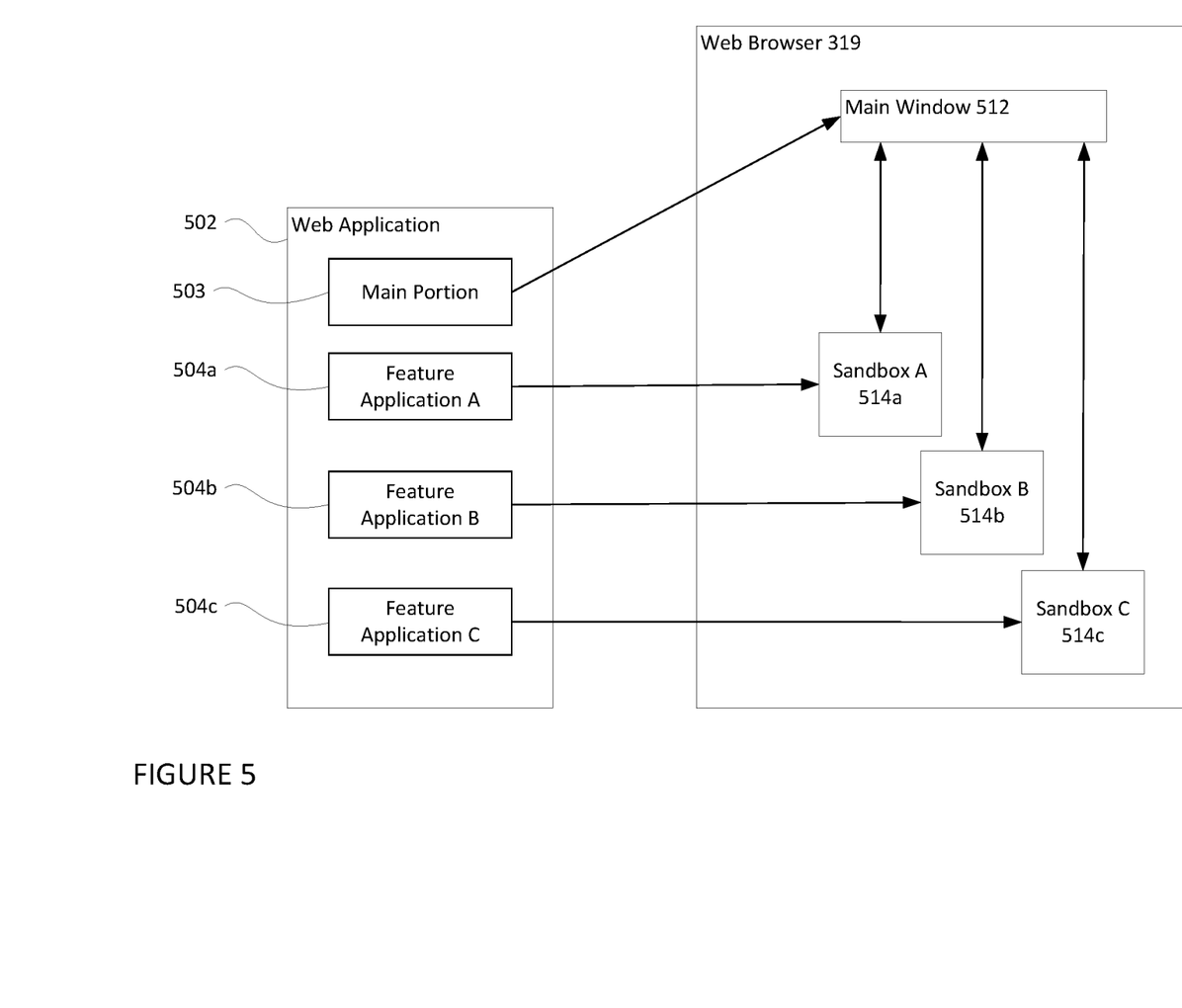
FIG. 5 illustrates an example of a web application loaded into a web browser in accordance with aspects of the disclosure.

FIG. 4 illustrates the loading of a web application 502 into a web browser 319 in accordance with step 404 of flow chart 400. The web application 502 may include a main portion 503 and feature applications 504a-504c. The main portion 503 of the web application is loaded in the main window 512 of the browser. Each individual feature application 504a, 504b, and 504c is loaded into respective sandboxed environments 514a, 514b, and 541c. The sandboxed environments may be hidden iframes. Although only three feature applications and three sandboxed environments are shown in FIG. 5, any number of feature applications and sandboxed environments may be executed.

Referring again to FIG. 4, at steps 406 each sandboxed environment, such as sandboxed environments 514a-514c, may be patched by the RIF 318. The patches applied to each sandboxed environment may occur once the sandboxed environment is loaded, once the sandboxed environment begins its first execution, or when the sandboxed environment executes a particular operation.

At step 407 the main window, such as main window 512, may be patched by the RIF 138 as described herein. The patches of the main window 512 may be active while sandboxed environments are executing and disabled, or not applied, when sandboxed environments are not executing. In this regard, the RIF may monitor the sandboxed environments, such as sandboxed environments 514a-514c, and determine whether a sandboxed environment is executing, as shown in block 408. When a sandboxed environment is determined to be executing, the main page patches may be executed by the RIF 318 as shown in block 410. When the sandboxed environments 514a-514c are not executing, the RIF 318 may be disable or otherwise not apply the patches to the main window 512.

The patches applied by the RIF 318 to the sandboxed environments and main window are described below.

Dom Patching

Sandboxed environments in hidden iframes may only be able to write to portions of the DOM associated with the hidden iframe's window and document. Absent RIF patching, sandboxed environments may be unable to provide UI elements outside of the hidden iframe or provide trigger UI elements in the main window in real-time based on events occurring in the iframe window or main window. To address these issues the RIF 318 may apply DOM patches to the sandboxed environments, such as sandboxed environments 514a-514c, and/or the main window, such as main window 512.

A DOM redirection patch may be applied to API's a sandboxed environment uses to interact with the DOM. The DOM redirection patch may cause all DOM access from the sandboxed environment via the patched API's to talk to the main window, while still using the sandboxed environment's implementations of invoked DOM methods. By using the sandboxed environment's implementation of invoked DOM methods, the sandboxed environment may be patched or polyfilled by the sandboxed environment's code. The DOM redirection patch behavior may be as follows:

If target===sandboxed window, change it to main window.

If target===sandboxed document, change it to main document.

The RIF 318 may track all DOM nodes created by the sandboxed environment and inserted into the DOM. In this regard, subtrees within a DOM can be constructed in a detached state, and as such, may be tracked at creation. Otherwise the DOM nodes may be tracked when they are attached to the DOM. To track the DOM nodes, the RIF may patch the main window with a Node insertion patch such that it tracks all DOM nodes created by the sandboxed environments for insertion into the main document. The Node insertion patch may process the DOM redirections in two-stages—stage one, when they get created and stage two, when they get attached to the main document.

Figure 6A:
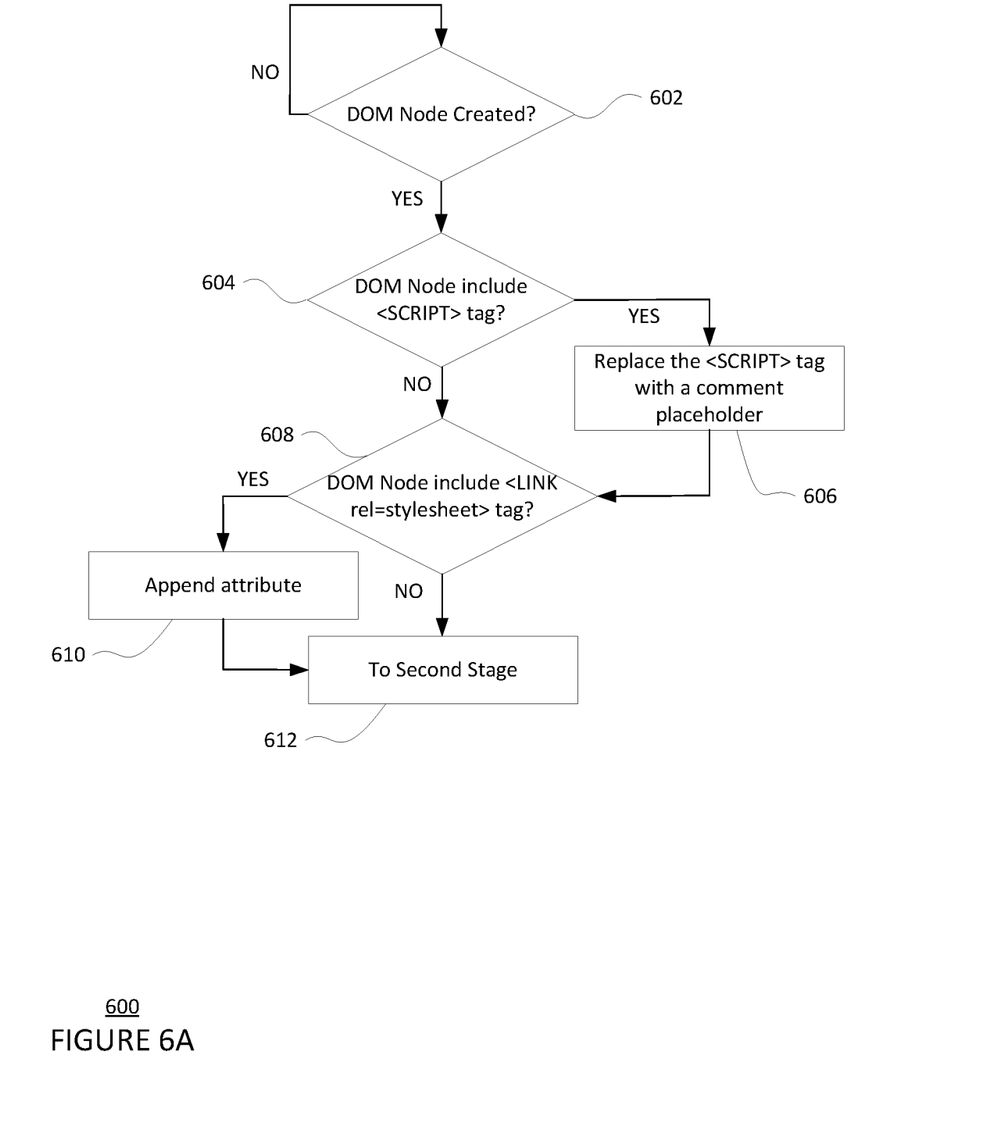
FIGS. 6A and 6B are flow diagrams representing document object model (DOM) node insertion in accordance with aspects of the disclosure.

FIG. 6A shows a flow diagram 600 of the first stage of the Node insertion patch. In the first stage, the RIF 318 monitors whether newly-created DOM nodes are created, as shown in block 602. When a DOM node is created, the RIF 318 may determine whether the DOM node includes a <SCRIPT> tag as shown in block 604. If a <SCRIPT> tag is included in the DOM node, the RIF 318 may replace the <SCRIPT> tag with a comment placeholder, as shown in blocks 606. The RIF may also determine if the DOM node includes a <LINK rel=stylesheet> tag, as shown in block 608. As shown in block 610, if a <LINK rel=stylesheet> tag is included in the DOM node, the RIF may append an attribute to provide access to the stylesheet for CSS selector rewriting, described herein. Upon completion of the first stage, the RIF 318 may move onto the second stage, as shown in block 612.

Figure 6B:
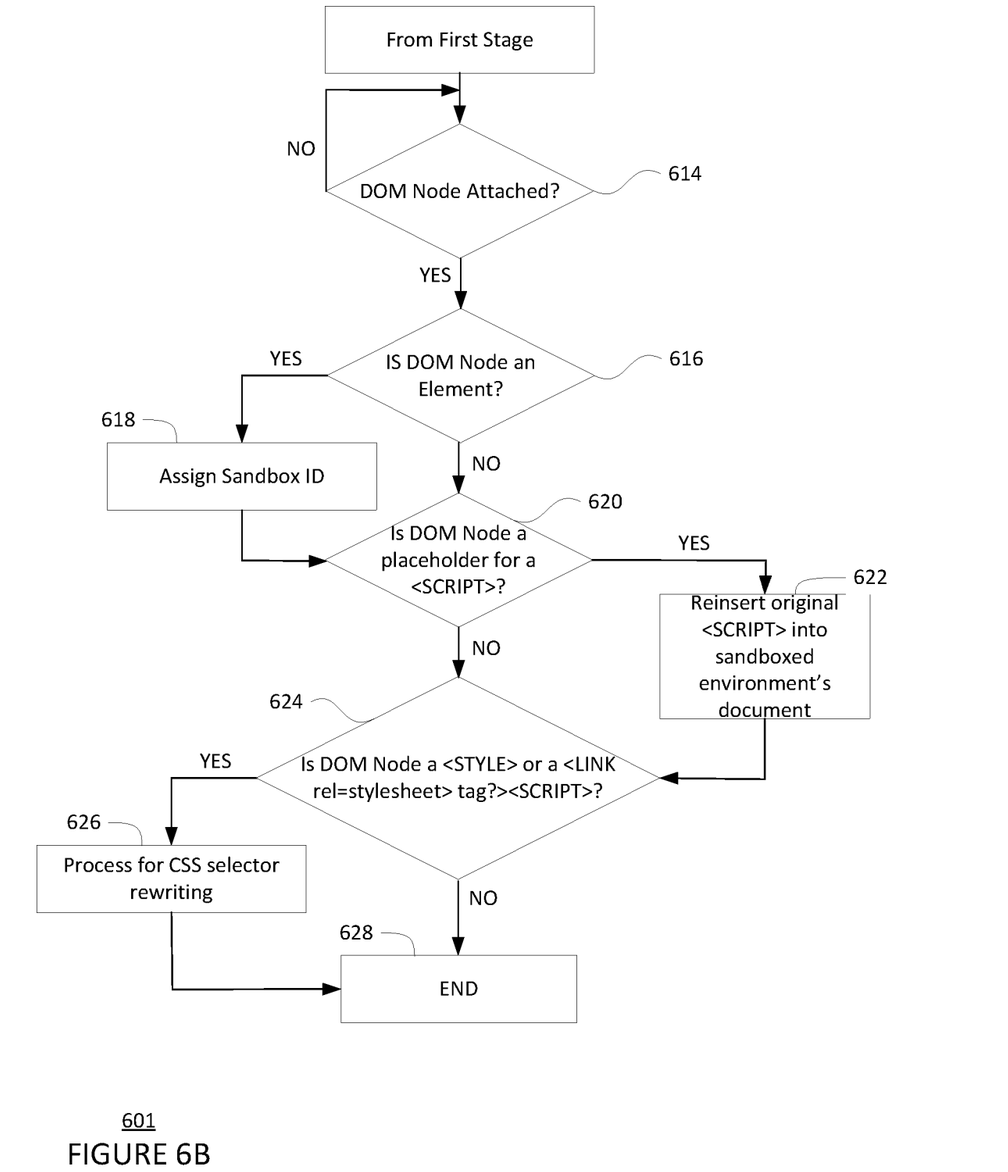

FIG. 6B shows a flow diagram 601 of the second stage of the Node insertion patch. In the second stage, the RIF 318 monitors if a DOM node is attached to the document, as shown in block 614. If a DOM node is inserted, the RIF determined if the DOM node is an element, as shown in block 616. When the DOM node is an element, a sandbox ID may be assigned, as shown in block 618. In this regard, each sandboxed environment 514a-514c may have an ID assigned by the RIF 318. Each element created by a sandboxed environment may be marked with a respective sandbox ID so that the RIF 318 can track the elements in the DOM by sandboxed environment. By assigning sandbox IDs to each element, stylistic changes made by a feature application, may be limited to elements in the DOM that have a sandbox ID associated with the sandbox environment of the feature application. Additionally, when a feature application is closed, all elements assigned the sandbox ID associated with that feature application may be removed from the browser, thereby allowing the computing device to perform garbage collection of the sandboxed environment.

In some instances, third-party libraries or other sources may generate identifications using an auto-incremented number, with the assumption that they will be unique. However, in the instance of multiple feature applications and a main application the identifications may be duplicated. To disambiguate duplicate identifications, the RIF may patch the identifications by appending or prefixing the sandbox ID.

Referring now to block 620 of FIG. 6B, the RIF 318 may determine if the DOM node includes a comment placeholder. As described with reference to block 606 of FIG. 6A, DOM nodes that have been created with a <SCRIPT> tag are replaced with a comment placeholder. Upon the RIF determining a DOM node with a comment placeholder has been inserted, the original <SCRIPT> is inserted into the sandboxed environment's body as opposed to the main document, as shown in block 622. As such, the script gets evaluated in the context of the sandboxed environment instead of the main document.

As further shown in block 624 of flow diagram 601, the RIF may further determine whether a <STYLE> or <LINK rel=stylesheet> tag is in the inserted DOM node. When a DOM node includes a <STYLE> or <LINK rel=stylesheet> tag the RIF may process the DOM node for CSS selector rewriting as shown in block 626 and further described herein. Upon completion of blocks 624 and, if necessary, block 626, the second stage of the Node insertion patch may end as shown in block 628.

Jayscript Isolation

As described, when separate applications run in the same window, they may corrupt each other's state. For instance, applications may declare variables and another application can overwrite that variable. In another example, web applications may include polyfill code to provide implementations for JavaScript language & browser features that may not be present in particular browsers or versions of browsers. Polyfills may include code such as Object.entries( ) WeakMap, Promise.finally( ) etc. When more than one application is running in a window, a polyfill performed by one application may affect another application, leading to corruption of the state of the other application.

Similarly, many web applications monkey patch the runtime environment using JavaScript primitives like Array or Map, and DOM objects like EventTarget. These patches may be applied by both the framework and user code. In particular, Zone.js applications may patch asynchronous APIs, including, for example, Promise, setTimeout, addEventListener, etc. In the event these patches are applied more than once to the same environment the applications may become corrupt. In the event a patch is applied by a feature application without RIF patching, the main window may retain paths preventing the features application from getting garbage-collected. Unlike polyfills, if an API is patched twice, it will typically wrap the previously-applied patch. This can result in unpredictable behavior of the web application.

Patches may be applied by the RIF 318 to address the above issues. In this regard, an event target patch may be applied to the main window's APIs. The event target patch operates by taking event listeners corresponding to the sandboxed environments 514a-514c in the document and window objects of the main window 512 and changing them back to the respective sandboxed environments windows and documents. The event target patch behavior may be as follows:

If value===main window, change it to sandboxed environment window.

If value===main document, change it to sandboxed environment document.

Another javascript patch may include an instanceOf patch. Code executing in the sandbox environments 514a-514c often use instanceOf checks in generic event handler functions. Since events get triggered on elements in the main window, which is in a different space than the sandboxed environments, the target object prototype may be different. For example, a check for "event.target instanceOf HTMLAnchorElement" by a feature application executing in a sandboxed environment, such as sandboxed environment 514a would fail since the main window's HTMLAnchorElement would be different from the sandboxed environment's HTMLAnchorElement. To address this issue, the instanceOf patch may be applied to the sandboxed environments' APIs. The instanceOf patch may cause objects in the sandboxed environment to be replaced with their respective objects in the main window. The patch behavior of the instanceOf patch may be as follow:

Replace the sandboxed environments object implementation with the main window's implementation.

CSS Isolation

As described, the RIF 318 may isolate cascading style sheets (CSS) styles implemented in a sandboxed environment to prevent the sandboxed environment from changing the styles of the main window. As previously described with regard to FIG. 6B, when a DOM node includes a <STYLE> or <LINK rel=stylesheet> tag the RIF may process the DOM node for CSS selector rewriting as shown in block 626. A CSS selector rewriting patch may rewrite the selectors to append or otherwise include additional attribute qualifiers to a particular selector, such as the sandboxed ID of the sandboxed environment that inserted the DOM node. By including the sandboxed ID, execution of the stylesheets may be limited to only elements having the same sandboxed ID. In other words, a sandboxed environment may be restricted to adjust the style of elements within its own window.

The RIF 318 may further include a compatibility layer configured to allow web applications to use Zone.JS. For instance, the RIF 318 may include patches that isolate each implementation of a zone using sandboxed IDs. In another example, the RIF 318 may include a patch to ensure that ZoneJS handles event registration and dispatch across the main window and sandboxed environments. Other patches may also be applied by the RIF 318 to make sure On<event> properties, event and macro tasks, and micro tasks are executed by the appropriate zone.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method of executing a multi-portion web application, the method comprising:
    loading, by a web browser executing on one or more computing devices, a main portion of a web application into a main window;
    loading into a sandboxed environment, by the web browser, a feature application, the feature application comprising a portion of the web application; and
    applying, by a release isolation framework (RIF) executing on the one or more computing devices, one or more patches to the sandboxed environment, the one or more patches configured to redirect elements from a window of the sandboxed environment to the main window, wherein redirecting elements to the main window by the one or more patches includes:
        determining whether the elements are directed to the window of the sandboxed environment; and
        changing the elements to be directed to the main window when the elements are determined to be directed to the window of the sandboxed environment.

2. The method of claim 1, wherein the sandboxed environment is a hidden inline frame (iframes).

3. The method of claim 1, wherein redirecting elements to the main window by the one or more patches occurs when the elements are inserted into a document object model (DOM) of the main window.

4. The method of claim 3, further comprising:
    assigning a sandbox identification (ID) to the elements, wherein the sandbox ID is associated with the sandboxed environment.

5. The method of claim 4, further comprising:
    applying cascading style sheets (CSS) styles implemented in the sandboxed environment to only elements in the main window having the sandbox ID associated with the sandboxed environment.

6. The method of claim 1, further comprising:
    loading into one or more additional sandboxed environments, one or more additional feature applications, the one or more additional feature applications comprising additional portions of the web application; and
    applying, by the RIF, the one or more patches to the one or more additional sandboxed environment.

7. The method of claim 1, further comprising:
    applying, by the RIF, one or more additional patches to the main window, wherein the one or more additional patches are configured to assign a sandbox identification (ID) to each element of the feature application input into a document object model (DOM) of the main window.

8. The method of claim 7, wherein upon closing the feature application, the elements of the feature application input into the DOM are removed from the DOM, wherein removal includes:
    identifying all elements in the DOM having the sandbox ID; and
    removing the identified elements.

9. The method of claim 1, further comprising:
    applying, by the RIF, one or more patches to the main window, the one or more patches configured to track document object model (DOM) elements created by the sandboxed environments.

10. A system for executing a multi-portion web application, the system comprising:
    one or more processors; and
    one or more storage devices in communication with the one or more processors, wherein the one or more storage devices contain instructions configured to cause the one or more processors to:
    load, by a web browser, a main portion of a web application into a main window;
    load, into a sandboxed environment, by the web browser, a feature application, the feature application comprising a portion of the web application; and
    apply, by a release isolation framework (RIF), one or more patches to the sandboxed environment, the one or more patches configured to redirect elements from a window of the sandboxed environment to the main window, wherein redirecting elements to the main window by the one or more patches includes:
        determining whether the elements are directed to the window of the sandboxed environment; and
        changing the elements to be directed to the main window when the elements are determined to be directed to the window of the sandboxed environment.

11. The system of claim 10, wherein the sandboxed environment is a hidden inline frame (iframes).

12. The system of claim 10, wherein redirecting elements to the main window by the one or more patches occurs when the elements are inserted into a document object model (DOM) of the main window.

13. The system of claim 12, wherein the instructions are further configured to cause the one or more processors to:
    assign a sandbox identification (ID) to the elements, wherein the sandbox ID is associated with the sandboxed environment.

14. The system of claim 13, wherein the instructions are further configured to cause the one or more processors to:
    apply cascading style sheets (CSS) styles implemented in the sandboxed environment to only elements in the main window having the sandbox ID associated with the sandboxed environment.

15. The system of claim 10, wherein the instructions are further configured to cause the one or more processors to:

load into one or more additional sandboxed environments one or more additional feature applications, the one or more additional feature applications comprising additional portions of the web application; and apply, by the RIF, the one or more patches to the one or more additional sandboxed environment.

16. The system of claim 10, wherein the instructions are further configured to cause the one or more processors to:
apply, by the RIF, one or more additional patches to the main window, wherein the one or more additional patches are configured to assign a sandbox identification (ID) to each element of the feature application input into a document object model (DOM) of the main window.

17. The system of claim 16, wherein upon closing the feature application, the elements of the feature application input into the DOM are removed from the DOM, wherein removal includes:
identifying all elements in the DOM having the sandbox ID; and
removing the identified elements.

18. The system of claim 10, wherein the instructions are further configured to cause the one or more processors to:
apply, by the RIF, one or more patches to the main window, the one or more patches configured to track document object model (DOM) elements created by the sandboxed environments.

* * * * *